US012340622B2

(12) United States Patent
Singh et al.

(10) Patent No.: US 12,340,622 B2
(45) Date of Patent: *Jun. 24, 2025

(54) INCREASING A FALSE POSITIVE IDENTIFICATION RATE OF A FACE RECOGNITION ALGORITHM BY ALTERING A VALUE OF AN IMAGE CLASSIFICATION FEATURE ASSOCIATED WITH THE FACE RECOGNITION ALGORITHM

(71) Applicant: Dauntless Labs, LLC, Austin, TX (US)

(72) Inventors: Annika P. Singh, Austin, TX (US); Arati P. Singh, Austin, TX (US)

(73) Assignee: Dauntless Labs, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/514,497

(22) Filed: Nov. 20, 2023

(65) Prior Publication Data

US 2025/0104471 A1    Mar. 27, 2025

Related U.S. Application Data

(63) Continuation of application No. 18/474,750, filed on Sep. 26, 2023, now Pat. No. 11,837,019.

(51) Int. Cl.
*G06V 40/16* (2022.01)

(52) U.S. Cl.
CPC .................. *G06V 40/172* (2022.01)

(58) Field of Classification Search
CPC ........... G06V 40/40–45; G06V 40/172
See application file for complete search history.

(56) References Cited

U.S. PATENT DOCUMENTS

| 7,724,171 B2 * | 5/2010 | Lee ............. G09G 3/3696 341/120 |
| 8,194,938 B2 * | 6/2012 | Wechsler ......... G06V 10/774 382/118 |
| 10,755,447 B2 * | 8/2020 | Chhaya ............ G06V 10/82 |

(Continued)

OTHER PUBLICATIONS

Banerjee et al., "MakeUpMirror: mirroring make-ups and verifying faces post make-up", IET Biometrics, 2018, vol. 7, Iss. 6, pp. 598-605 (Year: 2018).*

(Continued)

*Primary Examiner* — Aaron W Carter

(57) ABSTRACT

Systems and methods for increasing a false positive identification rate of a face recognition algorithm are provided. A method includes using a first image sensor, acquiring image data for a first facial image of a person and selecting an application profile for the first facial image. The application profile is selected to modify the image data to alter a value of an image classification feature used by a face recognition algorithm to increase a false positive identification rate of the face recognition algorithm that is configured to match an input facial image with at least one of N stored facial images. The method further includes, modifying an aspect associated with the face of the person, such that a second facial image of the face, when acquired by a second image sensor subsequent to the modification of the aspect, is different from the first facial image.

20 Claims, 10 Drawing Sheets

(56) References Cited

U.S. PATENT DOCUMENTS

| | | | |
|---|---|---|---|
| 10,993,905 B2* | 5/2021 | Fisas Verges | A61K 8/99 |
| 11,178,956 B1* | 11/2021 | Prout | A45D 44/005 |
| 11,837,019 B1* | 12/2023 | Singh | G06V 10/776 |
| 2010/0243514 A1* | 9/2010 | Samain | A61Q 1/08 |
| | | | 132/200 |
| 2010/0252061 A1* | 10/2010 | Samain | A61K 8/69 |
| | | | 132/200 |
| 2012/0017929 A1* | 1/2012 | Samain | A61K 8/4986 |
| | | | 132/288 |
| 2012/0044335 A1* | 2/2012 | Goto | A45D 44/005 |
| | | | 348/E7.085 |
| 2012/0223956 A1* | 9/2012 | Saito | G06F 3/0481 |
| | | | 382/284 |
| 2013/0160785 A1* | 6/2013 | Thevenet | A61Q 3/02 |
| | | | 132/200 |
| 2014/0004275 A1* | 1/2014 | Yin | B05D 3/207 |
| | | | 427/547 |
| 2015/0049924 A1* | 2/2015 | Tang | G06V 40/16 |
| | | | 382/118 |
| 2016/0110587 A1* | 4/2016 | Han | G06T 11/60 |
| | | | 382/118 |
| 2017/0076474 A1* | 3/2017 | Fu | G06T 11/00 |
| 2017/0358116 A1* | 12/2017 | Cheng | G06T 11/60 |
| 2018/0075524 A1* | 3/2018 | Sartori Odizzio | G06T 11/001 |
| 2018/0276453 A1* | 9/2018 | Takei | G06T 1/00 |
| 2019/0325616 A1* | 10/2019 | Chhaya | G06V 40/167 |
| 2019/0347832 A1* | 11/2019 | Nishi | G06V 40/18 |
| 2019/0362134 A1* | 11/2019 | Kim | G06V 10/82 |
| 2020/0026906 A1* | 1/2020 | Ajiki | G01C 3/06 |
| 2020/0134371 A1* | 4/2020 | Charraud | G06V 10/82 |
| 2021/0004569 A1* | 1/2021 | Zhao | G06T 7/11 |
| 2021/0397863 A1* | 12/2021 | Kose Cihangir | G06V 40/171 |
| 2022/0180485 A1* | 6/2022 | Chen | G06T 7/194 |
| 2022/0211163 A1* | 7/2022 | Yang | G06V 10/56 |
| 2022/0319064 A1* | 10/2022 | Yeh | G06T 11/60 |
| 2023/0180917 A1* | 6/2023 | Si | G06Q 30/0643 |
| | | | 434/100 |
| 2023/0230325 A1* | 7/2023 | Lin | G06V 40/172 |
| | | | 345/419 |
| 2023/0260167 A1* | 8/2023 | Mao | G06V 40/168 |
| | | | 345/619 |

OTHER PUBLICATIONS

Chen et al., "Spoofing Faces Using Makeup: An Investigative Study", IEEE (Year: 2017).*

Rathgeb et al., "Detection of Makeup Presentation Attacks based on Deep Face Representations", 2020 25th International Conference on Pattern Recognition (ICPR) Milan, Italy, Jan. 10-15, 2021 (Year: 2021).*

Chen et al., "Automatic Facial Makeup Detection with Application in Face Recognition", IEEE (Year: 2013).*

* cited by examiner

EVALUATING A FACE RECOGNITION ALGORITHM THAT IS CONFIGURED TO MATCH AN INPUT FACIAL IMAGE WITH AT LEAST ONE OF N STORED FACIAL IMAGES, WHERE N IS GREATER THAN 10,000, TO DETERMINE A RELATIONSHIP BETWEEN IMAGE CLASSIFICATION FEATURES AND A FALSE POSITIVE IDENTIFICATION RATE OF THE FACE RECOGNITION ALGORITHM

1010

USING A FIRST IMAGE SENSOR, ACQUIRING IMAGE DATA FOR A FIRST FACIAL IMAGE OF THE PERSON, WHERE THE IMAGE DATA IS ACQUIRED BY POSITIONING THE IMAGE SENSOR AT LEAST 40 FEET AWAY FROM THE FACE OF THE PERSON

1020

PROCESSING THE IMAGE DATA TO SELECT A COSMETIC APPLICATION PROFILE FOR THE FIRST FACIAL IMAGE, WHERE THE COSMETIC APPLICATION PROFILE IS SELECTED TO MODIFY THE IMAGE DATA TO ALTER A VALUE OF AT LEAST ONE OF THE IMAGE CLASSIFICATION FEATURES IN ORDER TO INCREASE THE FALSE POSITIVE IDENTIFICATION RATE OF THE FACE RECOGNITION ALGORITHM

1030

GENERATING A SET OF VALUES CORRESPONDING TO A MAGNETIC FIELD PATTERN FOR USE WITH A MAGNETIC FIELD APPLICATOR BY PROCESSING THE SELECTED COSMETIC APPLICATION PROFILE AND TRANSMITTING THE SET OF VALUES TO THE MAGNETIC FIELD APPLICATOR

1040

BASED ON THE SET OF VALUES APPLYING MAGNETIC FIELDS, USING THE MAGNETIC FIELD APPLICATOR, TO NANOPARTICLES EMBEDDED IN A COSMETIC APPLIED TO THE FACE OF THE PERSON TO MODIFY AN APPEARANCE OF THE COSMETIC SUCH THAT A SECOND FACIAL IMAGE OF THE FACE WHEN ACQUIRED BY A SECOND IMAGE SENSOR, DIFFERENT FROM THE FIRST IMAGE SENSOR, SUBSEQUENT TO THE APPLICATION OF THE MAGNETIC FIELDS IS ALTERED TO INCREASE THE FALSE POSITIVE IDENTIFICATION RATE OF THE FACE RECOGNITION ALGORITHM WHEN DETECTING A 1:M MATCH BETWEEN THE SECOND FACIAL IMAGE AND M STORED FACIAL IMAGES, WHEREIN M IS GREATER THAN 10,000

INCREASING A FALSE POSITIVE IDENTIFICATION RATE OF A FACE RECOGNITION ALGORITHM BY ALTERING A VALUE OF AN IMAGE CLASSIFICATION FEATURE ASSOCIATED WITH THE FACE RECOGNITION ALGORITHM

CROSS-REFERENCE TO A RELATED APPLICATION

This application is a continuation of U.S. application Ser. No. 18/474,750, filed Sep. 26, 2023, titled "EVALUATING FACE RECOGNITION ALGORITHMS IN VIEW OF IMAGE CLASSIFICATION FEATURES AFFECTED BY SMART MAKEUP," the entire contents of which are hereby incorporated herein by reference.

BACKGROUND

Machine-learning based face recognition systems rely upon trained artificial intelligence to match a scanned face with an existing database of faces. Such systems are trained using a large set of face images. The training itself may include teaching a machine-learning based system to match a feature set with a facial image allowing for reliable face recognition. Depending on the size and the rigor of such training, the face recognition system can match a facial image to an entry in a database of images. Many such face recognition systems extract features of a face based on observable characteristics of the surface of a face.

Despite advances in the underlying technology associated with such systems, error rates, including false positives, remain an issue.

SUMMARY

In one example, the present disclosure relates to a method including using a first image sensor, acquiring image data for a first facial image of a person. The method may further include processing the image data to select a cosmetic application profile for the first facial image, where the cosmetic application profile is selected to modify the image data to alter a value of at least one image classification feature used by a face recognition algorithm in order to increase a false positive identification rate of the face recognition algorithm that is configured to match an input facial image with at least one of N stored facial images, where N is greater than 1,000.

The method may further include by processing the selected cosmetic application profile, generating a set of values corresponding to a magnetic field pattern for use with a magnetic field applicator and transmitting the set of values to the magnetic field applicator. The method may further include using the magnetic field applicator, based on the set of values, applying magnetic fields to nanoparticles embedded in a cosmetic composition applied to the face of the person, such that a second facial image of the face, when acquired by a second image sensor subsequent to the application of the magnetic fields is different from the first facial image acquired by the first image sensor.

In another example, the present disclosure relates to a method including using a first image sensor, acquiring image data for a first facial image of a person, where the image data is acquired by positioning the first image sensor at least 20 feet away from the face of the person. The method may further include processing the image data to select a cosmetic application profile for the first facial image, where the cosmetic application profile is selected to modify the image data to alter a value of at least one image classification feature used by a face recognition algorithm in order to increase a false positive identification rate of the face recognition algorithm that is configured to match an input facial image with at least one of N stored facial images, where N is greater than 1,000.

The method may further include by processing the selected cosmetic application profile, generating a set of values corresponding to a magnetic field pattern for use with a magnetic field applicator and transmitting the set of values to the magnetic field applicator. The method may further include using the magnetic field applicator, based on the set of values, applying magnetic fields to nanoparticles embedded in a cosmetic applied to the face of the person to modify an appearance of the cosmetic, such that a second facial image of the face, when acquired by a second image sensor subsequent to the application of the magnetic fields is different from the first facial image acquired by the first image sensor.

In yet another example, the present disclosure relates to a method including evaluating a face recognition algorithm that is configured to match an input facial image with at least one of N stored facial images, where N is greater than 10,000, to determine a relationship between image classification features and a false positive identification rate of the face recognition algorithm. The method may further include using a first image sensor, acquiring image data for a first facial image of the person, where the image data is acquired by positioning the image sensor at least 40 feet away from the face of the person. The method may further include processing the image data to select a cosmetic application profile for the first facial image, where the cosmetic application profile is selected to modify the image data to alter a value of at least one of the image classification features in order to increase the false positive identification rate of the face recognition algorithm.

The method may further include generating a set of values corresponding to a magnetic field pattern for use with a magnetic field applicator by processing the selected cosmetic application profile and transmitting the set of values to the magnetic field applicator. The method may further include based on the set of values applying magnetic fields, using the magnetic field applicator, to nanoparticles embedded in a cosmetic applied to the face of the person to modify an appearance of the cosmetic such that a second facial image of the face when acquired by a second image sensor, different from the first image sensor, subsequent to the application of the magnetic fields is altered to increase the false positive identification rate of the face recognition algorithm when detecting a 1:M match between the second facial image and M stored facial images, where M is greater than 10,000.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 is a flow chart of a method associated with the various embodiments.

DETAILED DESCRIPTION

Figure 1:
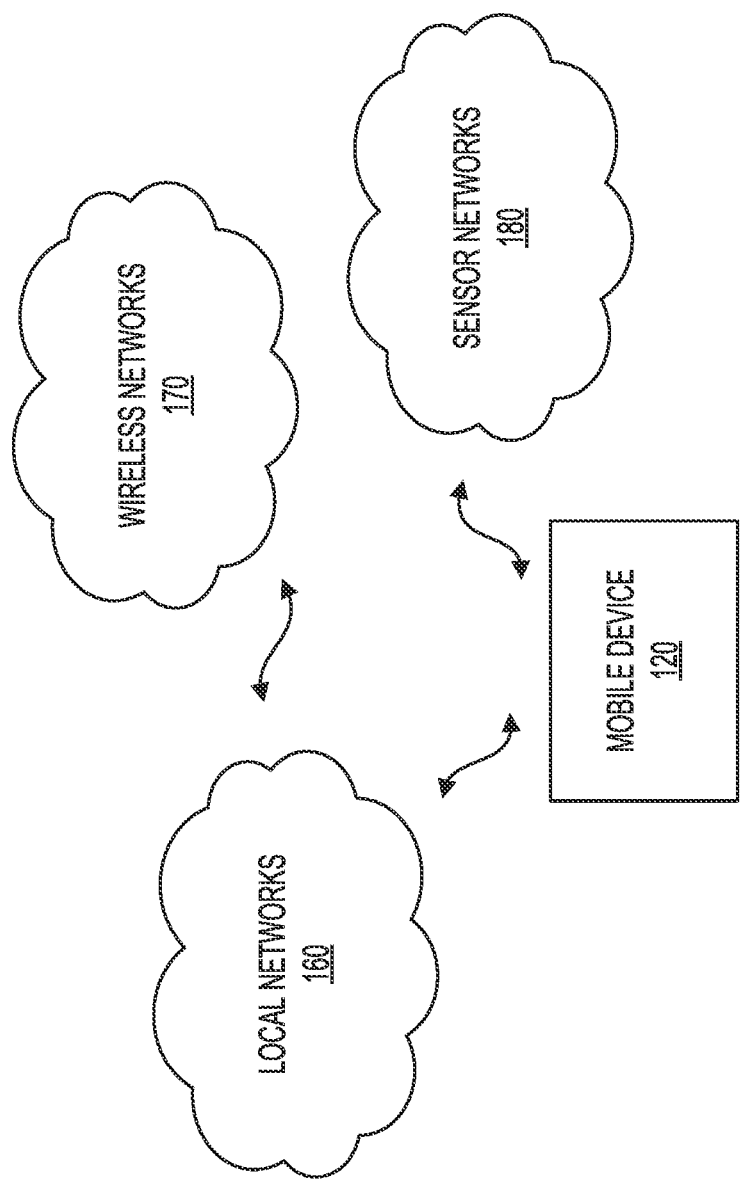
FIG. 1 is a diagram of a system environment for applying smart makeup in accordance with one example.
Figure 1:
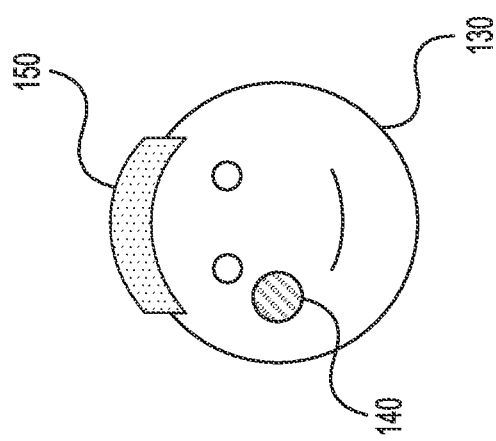

Security cameras can recognize faces using face recognition technology. Face recognition technology may identify specific features of a person's face and compare them to a database of known faces. Such systems first use a camera to capture an image of a person's face and isolate the face from the background or other undesirable captured aspects of the image. Next, face recognition technology may extract specific features from the face, such as the distance between the eyes, the size or shape of the eyes, the shape and the size of the forehead, the shape of the nose, and the size of the mouth, etc.

Next, the face recognition technology may analyze these features using a trained artificial intelligence neural network to determine whether a sufficient number of the features show a match with an image in a database of known faces (known as 1:N matching). This process may include the use of convolution neural networks (CNNs), recursive neural networks (RNNs), or other types of neural networks that have been trained to extract features from an image and then classify the image as matching (or not) one or more of the known images of the faces. The training process itself relies upon techniques, such as stochastic gradient descent (SGD) to determine appropriate weights and updated weights for use in training the neural network. Once trained, the neural network model is used to process the extracted facial features and compare them with the features of stored face images to determine a match.

Increasingly, face recognition technology is being used in applications beyond biometric identification for authentication/login purposes. As an example, face recognition technology has been deployed as part of surveillance cameras, which may capture facial images that can be used as evidence of criminal conduct in a court of law. While admissibility of such evidence is subject to the rules of evidence used for any other piece of evidence, reliance on such face recognition technology poses challenges. These challenges include privacy violations and improper use of such technology in policing and identifying suspects by police or other law enforcement agencies.

Moreover, many face recognition systems have demonstrated higher error rates (e.g., false positives) with respect to facial images of people, whose faces may be different from the training dataset of images used to train such systems. As an example, in the United Kingdom, surveillance cameras that scan an individual's face and classify them as either criminal or innocent have begun integrating into the society. However, a study found that the use of this technology in the UK led to a 98% rate of failure among African Americans. According to this study, the face recognition technology falsely classified African Americans as criminal/suspicious at a rate of 98%, and sometimes falsely classified white criminals as innocent at a higher rate than criminal.

Not only this, but an American Civil Liberties Union (ACLU) brief summarizing the Lynch v. State case stated that "Willie Lynch was sentenced to eight years in prison after the police implicated him using an unproven, error-prone face recognition algorithm . . . the state relied on the algorithm as the cornerstone of its investigation." Until these face recognition algorithms become properly trained and are deployed in a manner that does not result in false positives in the context of policing and judiciary, other solutions are needed.

Makeup has become an essential part of human existence. Smart makeup configured using the application of intelligent force vectors can impact the accuracy of facial recognition systems. Visually observable characteristics of a surface area having at least some particles (e.g., nanoparticles) are a function of several factors, including an orientation, an arrangement, or a density of the nano-particles. Configuring a visual characteristic of the surface area may produce interesting results with respect to applications of certain compositions to certain surfaces. As an example, compositions used for cosmetic purposes may be configured based on the application of intelligent force vectors. Such use of makeup is referred to herein as smart makeup.

Smart makeup works against these biases. Smart makeup uses nanoparticles to alter feature analysis performed by face recognition algorithms. Smart makeup can be used to plant seeds of doubt in the context of matching an image with a database of images, which works by extracting features. Its existence lowers trust in biometrics being used in police departments and courts. In the ACLU brief, the state was relying on the evidence based on face recognition technology as a huge aspect of their case. Smart makeup will move law and investigation away from the usage of this technology (until they are improved) that often falsely categorizes people of color at a higher rate than the population as a whole in countries where the training datasets are skewed in the other direction. In the countries with the population having a different mix, the use of this technology may help people other than the people of color. In sum, until facial recognition technology reaches a level of accuracy that is appropriate for use as part of law enforcement and judiciary, its use may be further constrained or otherwise impacted by the use of smart makeup. At the same time, smart makeup may be used to better train face recognition algorithms, such that they are properly trained, and thus are less likely to produce false positives or false negatives.

FIG. 1 is a schematic diagram of an example system environment 100 for various methods and systems associated with the present disclosure, including applying smart makeup. A user of a mobile device 120 may apply a cosmetic composition to a portion 140 of their face or any other part of their body. In one embodiment, the user may wear a band 150 on their head or another portion of their body depending upon the application of the cosmetic composition area. Band 150 may communicate via local networks 160 with mobile device 120 and other networks, such as wireless networks 170 and sensor networks 180. Local networks 160 and wireless networks 170 may include cellular networks, Wi-Fi networks, Personal Area Networks, such as Bluetooth, or other types of wireless networks. Wireless networks 170 may include not only communication apparatuses, such as cell sites, but also cloud computing infrastructure. The cloud computing infrastructure may be used to provide additional computing and storage functionality to mobile device 120. Sensor networks 180 may allow mobile device 120 and band 150 to engage in machine-to-machine communication with other devices and sensors. While FIG. 1 shows separate sensor networks 180, the functionality related to these networks may be included in wireless networks 170. In addition, although FIG. 1 shows a band 150 that the user is shown as wearing, similar functionality could be achieved via an attachment to mobile device 120.

Figure 2:
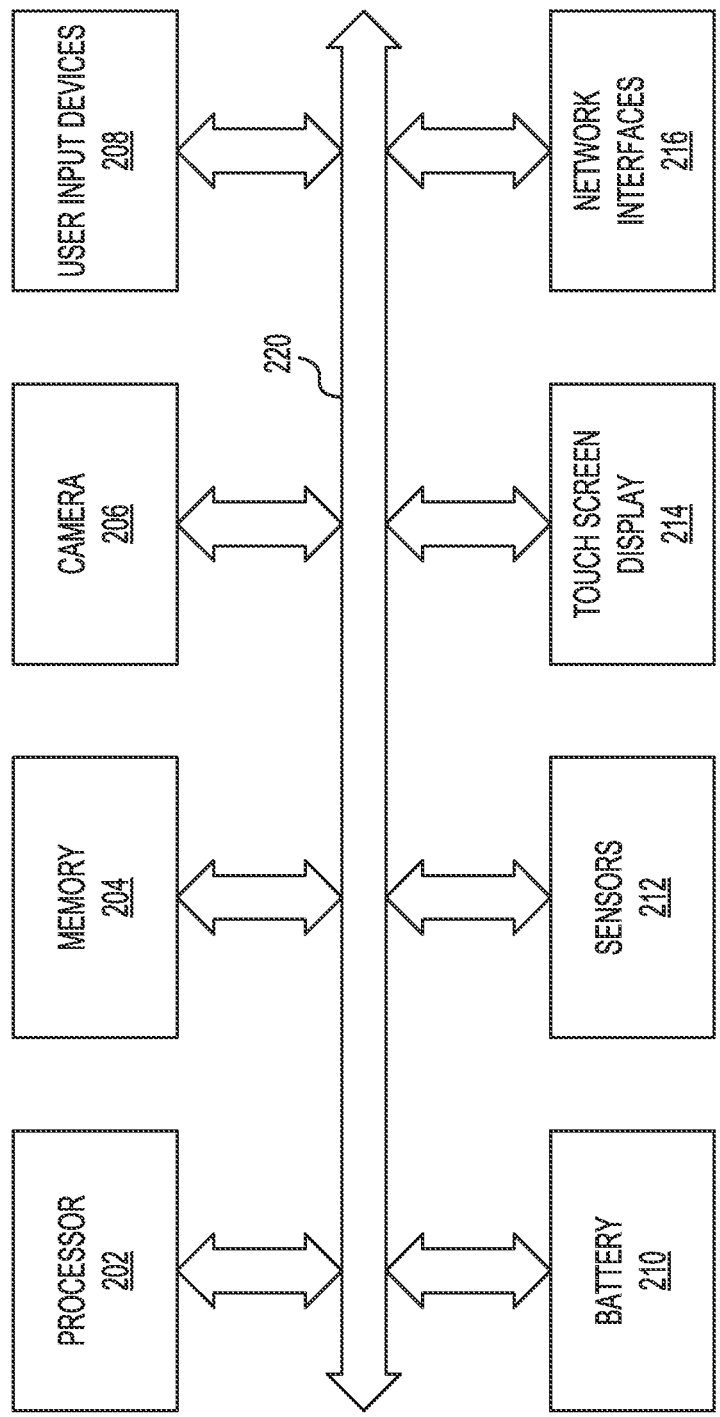
FIG. 2 is a diagram showing components of a device in accordance with one example.

FIG. 2 is a diagram showing example components of an example device 200 for implementing device 120 of the example system environment of FIG. 1. In one embodiment, device 200 may include a processor 202, memory 204, camera 206, and user input devices 208, battery 210, sensors 212, touch screen display 214, and network interfaces 216. Each of these components may be connected to each other (as needed for the functionality of device 200) via a bus system 220. Example mobile devices include a smartphone, such as an iPhone or any other similar device. Processor 202 may execute instructions stored in memory 204. Camera 206 may capture both still and moving images. User input devices 208 include haptic devices, such as keyboards or buttons, and touch screens. Battery 210 may be any portable battery, such as a chargeable lithium-ion battery. Sensors 212 may include a variety of sensors, such as accelerometers, gyroscopes, GPS, and proximity sensors. Touch screen display 214 may be any type of display, such as LCD, LED, or other types of display. As an example, touch screen display 214 may be a capacitive touch screen. The touch screen (e.g., display 214) can detect touch events, such as tapping on the screen or swiping on the screen. In response to such events, in combination with other modules, described later, touch image data may be generated and submitted to processor 202. Network interfaces 216 may include communication interfaces, such as cellular radio, Bluetooth radio, UWB radio, or other types of wireless or wired communication interfaces. Although FIG. 2 shows a specific number of components arranged in a certain manner, device 200 may include additional or fewer components arranged differently.

Figure 3:
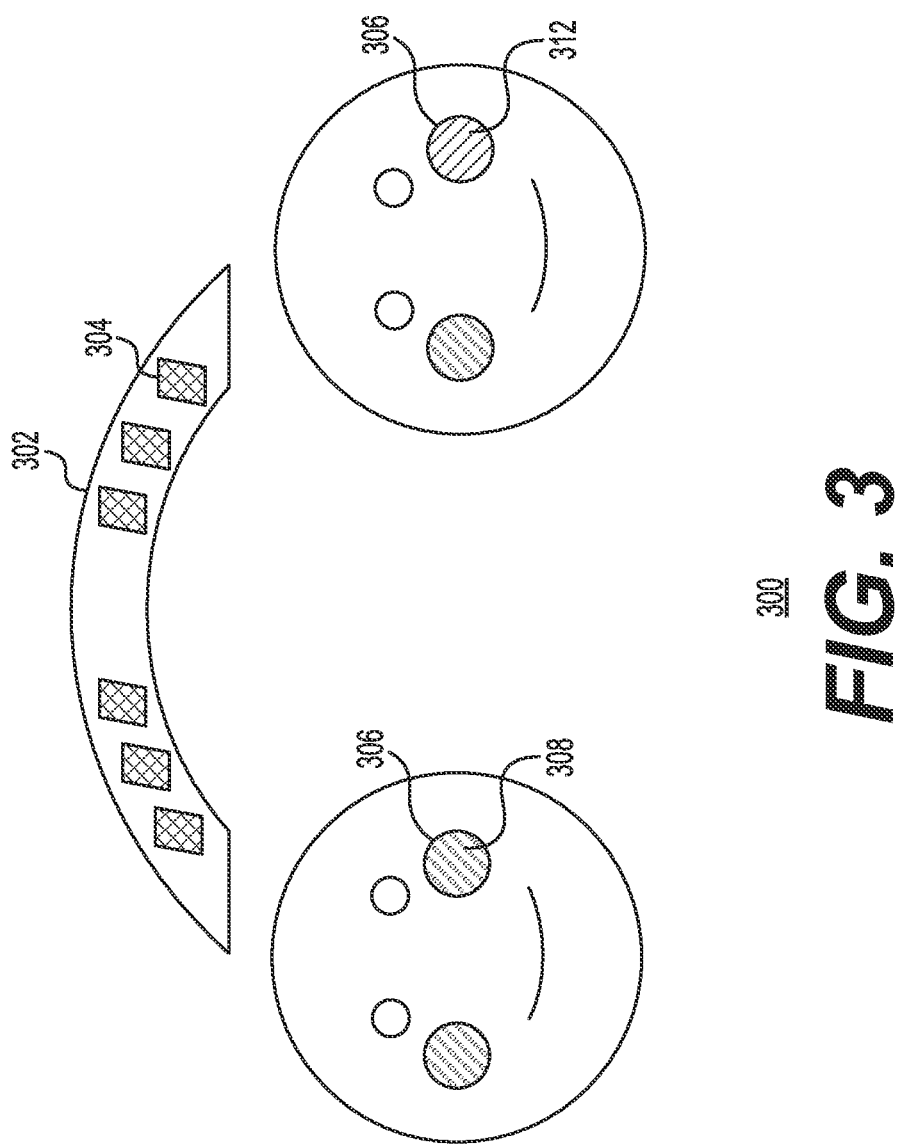
FIG. 3 is a diagram showing a band and an application of a magnetic field to a cosmetic composition applied to the face in accordance with one example.

FIG. 3 is a diagram showing a band 300 and application of magnetic field to a cosmetic composition applied to the face. Band 300 may correspond to band 150 of FIG. 1. In one embodiment, band 300 may include a housing 302. Housing 302 may include magnets 304 and a magnetic field generation unit. The magnetic field generation unit may control magnets 304 to generate a magnetic field corresponding to a magnetic field pattern. Magnets 304 may be soft iron magnetic coils that generate a magnetic field when a current is driven through the coil. The strength of the magnetic field will depend on the amount of current passed through the coil. Each magnet 304 may be controlled individually, or in groups, to generate a magnetic field based on a magnetic field pattern. Band 300 may thus be used to apply a magnetic field based on a magnetic field pattern to cosmetic composition applied to a body portion, such as a face of a person. Thus, as an example, a person may have a cosmetic composition applied to a portion 306 of their face. That cosmetic composition may have a certain appearance 308. Upon application of a controlled magnetic field, for example, using band 300, the appearance 308 of the cosmetic composition may change to a different appearance 312. The change in appearance may relate to a change in attributes related to the cosmetic composition. Example attributes include color, brightness, reflectivity, glint, iridescence, or tone. As used herein the term cosmetic composition is not limited to makeup, but also includes other types of compositions, such as face paint.

Figure 4:
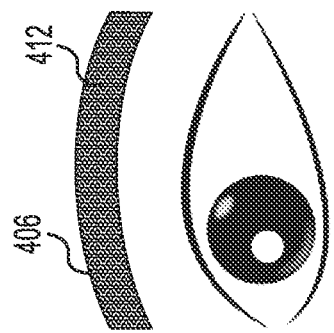
FIG. 4 is a diagram showing a wand and an application of a magnetic field to a cosmetic composition applied to the eye in accordance with one example.
Figure 4:
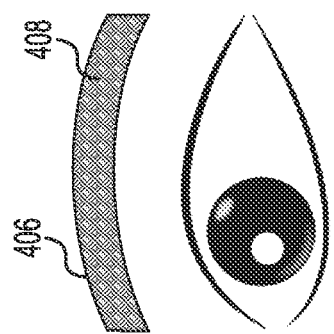
Figure 4:
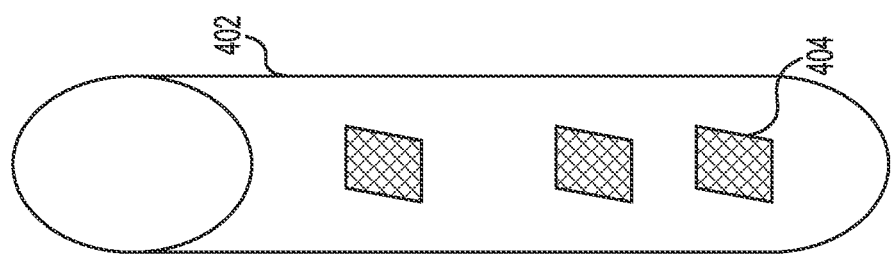

FIG. 4 is a diagram showing a wand 400 and the application of a magnetic field to a cosmetic composition applied near the eye, such as eyelids. In one embodiment, wand 400 may include a housing 402. Housing 402 may include magnets 404 and a magnetic field generation unit. The magnetic field generation unit may control magnets 404 to generate a magnetic field corresponding to a magnetic field pattern. Magnets 404 may be soft iron magnetic coils that generate a magnetic field when a current is driven through the coil. The strength of the magnetic field will depend on the amount of current passed through the coil. Each magnet 404 may be controlled individually, or in groups, to generate a magnetic field based on a magnetic field pattern. Wand 400 may thus be used to apply a magnetic field based on a magnetic field pattern to cosmetic composition applied to a body portion, such as a face of a person. Thus, as an example, a person may have a cosmetic composition applied to a portion 406 of their face. In this embodiment, portion 406 may be the area between the eyelashes and the eyebrows of the person, including, for example, the eyelid. That cosmetic composition may have a certain appearance 408. Upon application of a controlled magnetic field, for example, using wand 400, the appearance 408 of the cosmetic composition may change to a different appearance 412. The change in appearance may relate to a change in attributes related to the cosmetic composition.

Example attributes include color, brightness, reflectivity, glint, iridescence, or tone. In one embodiment, the cosmetic composition may not appear to be as colorful and iridescent for a day look. Once the person applies a controlled magnetic field to portion 406, it may reorient certain particles in the cosmetic composition to make the cosmetic composition more colorful and iridescent. This way a person may go from a day look to a night look in an instant. As another example, application of the controlled magnetic field to portion 406 may reorient certain particles in the cosmetic composition to make it look glittery for the night look. Although FIGS. 3 and 4 describe a band and a wand, other types of applicators may also be used for applying the controlled magnetic field. As an example, the magnetic field applicator could be disc-shaped, cube-shaped, oval-shaped, or other types of shapes and sizes.

In one embodiment, cosmetic composition may include magnetic particles that are sensitive to a magnetic field. Cosmetic composition may include non-magnetic particles as well, such as colorants etc. Magnetic particles may be particles that may include nickel, cobalt, iron and oxides or alloys of these metals. As an example, magnetic particles may include iron oxide, $Fe_3O_4$. In one embodiment, magnetic particles may be elongate in shape, such that they may be aligned in a direction of the magnetic field. They may be aspherical or spherical with non-uniform shape. This way when their orientation is changed in response to the application of a magnetic field, it may result in a change in the appearance of cosmetic composition applied to a body portion, such as the face of a person. In addition to magnetic particles, magnetic fibers, or composite magnetic particles may be used as part of cosmetic compositions. Additional details regarding cosmetic compositions including magnetic particles are described in U.S. Patent Publication No. 2013/0160785, which is incorporated by reference herein in its entirety. In particular, paragraphs 76 to 145 of this publication describe magnetic particles, magnetic fibers, and composite magnetic particles, each of which could be used as part of cosmetic compositions.

In addition to elements that are susceptible to a magnetic field, cosmetic composition may further include diffractive pigments, which are capable of producing a variation in color based on the angle of observation when hit by visible light. Cosmetic composition may further include reflective particles, which can reflect light and depending upon their orientation (affected by magnetic field), they might reflect light at different angles. Cosmetic composition may further include "nacres," which may optionally be iridescent, as produced in the shells of certain mollusks. Nacres may have a yellow, pink, red, bronze, gold, or coppery glint, which could produce a metallic look. Additional details regarding cosmetic compositions including diffractive pigments and reflective particles are described in U.S. Patent Publication No. 2013/0160785, which is incorporated by reference herein in its entirety. In particular, paragraphs 157 to 201 of the '785 publication describe diffractive pigments, reflective particles, and nacres, each of which could be used as part of cosmetic compositions.

Additionally, or alternatively to the particles described above, cosmetic composition may further include fillers, which may help maintain the texture of the cosmetic composition. Additional details regarding cosmetic compositions including fillers are described in U.S. Patent Publication No. 2013/0160785, which is incorporated by reference herein in its entirety. In particular, paragraphs 202 to 205 of the '785 publication describe fillers.

Additionally, or alternatively to the particles described above, cosmetic composition may further include composite pigments, which may be composed of particles including a magnetic core and a coating of an organic coloring substance. Additional details regarding cosmetic compositions including composite pigments are described in U.S. Patent Publication No. 2013/0160785, which is incorporated by reference herein in its entirety. In particular, paragraphs 224 to 316 of the '785 publication describe composite pigments.

Additionally, or alternatively to the particles described above, cosmetic composition may further include photochromic agents, whose tint changes when they are lit by ultraviolet light and the tint returns to its initial color when no longer lit. Additional details regarding cosmetic compositions including photochromic agents are described in U.S. Patent Publication No. 2013/0160785, which is incorporated by reference herein in its entirety. In particular, paragraphs 317 to 316 of the '785 publication describe composite pigments.

In another embodiment, cosmetic composition may include magnetically responsive photonic nanochains. Such magnetically responsive photonic nanochains may include iron oxide, $Fe_3O_4$ particles clustered with a thin layer of silica. The nanochains may diffract light differently depending upon the application of a magnetic field to such nanochains. Additional details regarding magnetically responsive photonic nanochains are described in U.S. Patent Publication No. 2014/0004275, which is incorporated by reference herein in its entirety. In particular, paragraphs 12 to 23 of the '275 publication describe magnetically responsive photonic nanochains and a process for forming them.

In one embodiment, cosmetic composition may include photochromic agents that are sensitive to radiation of certain wavelengths. Irradiation of such photochromic agents, which can be included in the cosmetic composition, may result in the look of the makeup. Additional details regarding such light-sensitive makeup are described in U.S. Patent Publication No. 2010/0243514, which is incorporated by reference herein in its entirety. In particular, paragraphs 63 to 109 of the '514 publication provide examples of photochromic agents that may be included in the cosmetic compositions.

In one embodiment, cosmetic composition may be such that after application of the magnetic field, the skin color lightens. In this manner, the cosmetic composition may be used to lighten skin color, such as the color of the face, arms, or other body parts, based on the application of the magnetic field. Alternatively, in one embodiment, cosmetic composition may be such that after application of the magnetic field, the skin color looks tanned. In this manner, the cosmetic composition may be used to tan skin, such as tanning of the face, arms, or other body parts. Such changes may be accomplished by changing the level of melanin in the skin. Moreover, particles such as tin-oxide that are used in sunscreens may also be used to lighten or otherwise change the appearance of the facial skin.

Figure 5:
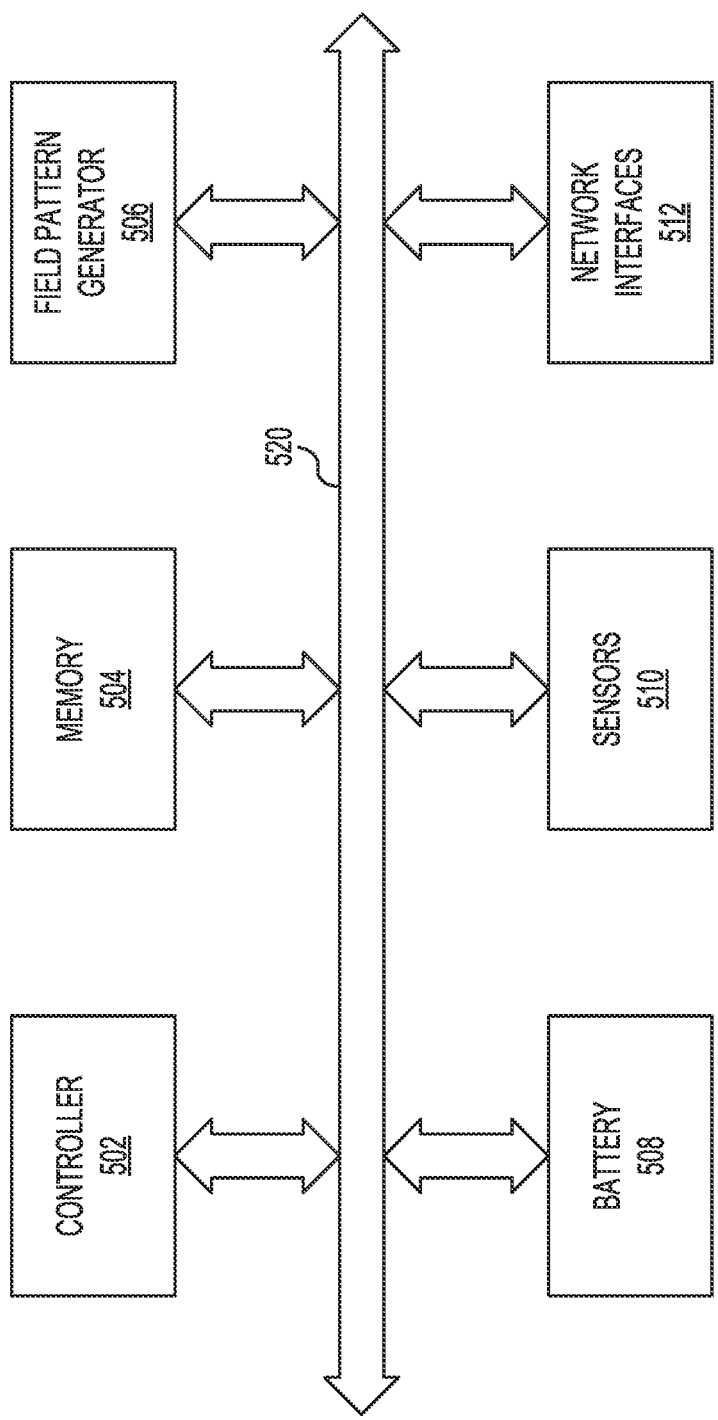
FIG. 5 is a diagram showing example components of a magnetic field applicator for applying a magnetic field to a cosmetic composition.

FIG. 5 is a diagram showing example components of a magnetic field applicator 500 for applying a magnetic field to a cosmetic composition. In one embodiment, magnetic field applicator 500 may include a controller 502, memory 504, magnetic field pattern generator 506, battery 508, sensors 510, and network interfaces 512. Each of these components may be connected to each other (as needed for the functionality of magnetic field applicator 500) via a bus system 520. Controller 502 may execute instructions stored in memory 504. Battery 508 may be any portable battery, such as a chargeable lithium-ion battery. Sensors 510 may include a variety of sensors, such as accelerometers, gyroscopes, GPS, and proximity sensors. Network interfaces 512 may include communication interfaces, such as cellular radio, Bluetooth radio, UWB radio, or other types of wireless or wired communication interfaces. Controller 502 may control the operation of magnetic field applicator 500 by processing data stored in memory 504 and managing interaction with other devices or networks via network interfaces 512. In addition, controller 502 may process data and control the behavior of sensors 512. Although FIG. 5 shows a specific number of components arranged in a certain manner, magnetic field applicator 500 may include additional or fewer components arranged differently.

In one embodiment, sensors 510 may include an ambient light sensor. The ambient light sensor may sense the intensity of the light in the room where a person is applying the cosmetic composition. The measured intensity of light may be communicated to controller 502 via bus 520. Controller 502 may process the data related to the light intensity and use that as a factor in controlling the operation of magnetic field applicator 500. As an example, controller 502 may alter inputs to (or control otherwise) magnetic field generator 506 in a way that in a room with less light the cosmetic composition is affected in a manner to be more reflective. This may be accomplished by altering the degree of orientation of magnetic particles or other constituents of the cosmetic composition, including, for example, nanochains. In another embodiment, controller 502 may receive sensor data relating to the intensity of light in a room or location that the person will be in subsequent to applying the cosmetic composition. This sensor data may be communicated via device 200 of FIG. 2 or directly to controller 502. Controller 502 may process the data related to the light intensity and use that as a factor in controlling the operation of magnetic field applicator 500. As an example, controller 502 may alter inputs to, or control otherwise, magnetic field generator 506 in a way that in a room with less light the cosmetic composition is affected in a manner to be more reflective. This may be accomplished by altering the degree of orientation of magnetic particles or other constituents of the cosmetic composition, including, for example, nanochains. Other attributes, such as color, brightness, reflectivity, glint, iridescence, or tone may also be affected using similar methodology.

Figure 6:
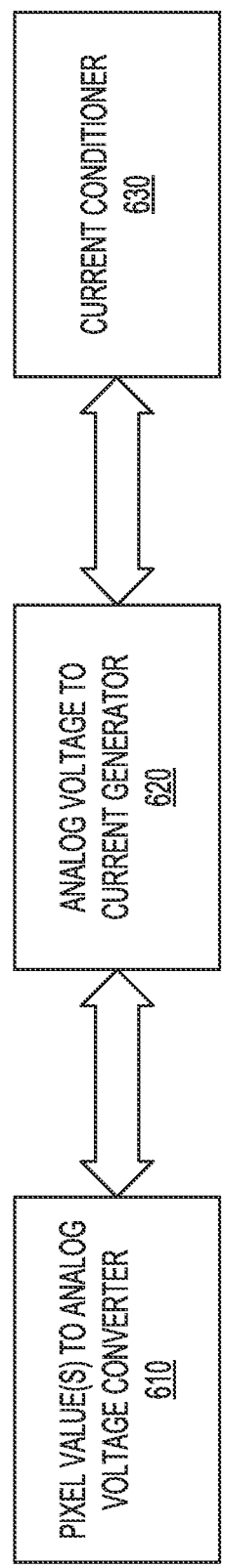
FIG. 6 is a diagram showing components of a magnetic field generator of FIG. 5 in accordance with one example.

FIG. 6 is a diagram showing example components of an example magnetic field pattern generator 506 of FIG. 5. In one embodiment, magnetic field pattern generator 506 may include a pixel values to analog voltage generator (PAVG) 610, an analog voltage to current generator (ACG) 620, and a current conditioner 630. PAVG 610 may be implemented using a digital to analog converter, such that the pixels (black or white) may be converted into a corresponding analog voltage. In one embodiment, PAVG 610 may also include gamma correction to correct for the non-linear way human eye processes light. Additional details regarding a pixel values to analog voltage generator, including gamma correction, are described in U.S. Pat. No. 7,724,171, which is incorporated by reference herein in its entirety. In particular, FIGS. 2 and 3 and the related description in the '171 patent describe a pixel values to analog voltage generator, including gamma correction. Analog voltage to current generator (ACG) 620 may convert the analog voltages into currents. In one embodiment, ACG 620 may be implemented using the Precision Voltage-to-Current Converter/Transmitter (XTR111) sold by Texas Instruments. Current conditioner 630 may be used to amplify the currents generated by ACG 620. The current conditioner 630 may also be used to: (1) increase the resolution of the currents generated by ACG 620, and (2) improve the signal to noise ratio. The currents conditioned by current conditioner 630 may be used to energize the magnetic coils. Although FIG. 6 shows a specific number of components arranged in a certain manner, magnetic field pattern generator 506 may include additional or fewer components arranged differently.

Referring back to FIG. 5, controller 502 is configured to execute instructions stored in memory 504 and generate a set of values corresponding to a magnetic field pattern for use with field pattern generator 506 of FIG. 5. The set of values may relate to the intensity of the magnetic field and the orientation of the magnetic field. In this example, controller 502 generates the set of values, in part, by processing the selected cosmetic application profile and transmitting the set of values to the field pattern generator 506 associated with the magnetic field applicator 500. Additionally, or alternatively, the set of values may be generated by trial and error processes to determine the type of values that best capture a given cosmetic application profile that can be used to modify the orientation or other aspects of nanoparticles included in the cosmetic composition applied to the face of the person. The set of values could be stored in a memory (e.g., memory 504 of FIG. 5). In other words, the set of values could simply be selected based on the cosmetic application profile stored in memory 504 of FIG. 5. The selection may be made based on a look-up table that correlates each cosmetic application profile to a corresponding set of values for field pattern generator 506 of FIG. 5.

Various modules including instructions may be stored in a memory of device 200 of FIG. 2 for processing image data to: (1) acquiring image data for a facial image of a person and processing the image data to select a cosmetic application profile for the facial image. In one embodiment, these modules may be stored in memory 204 of device 200 and may contain software instructions that when executed by processor 202 of device 200 may provide the functionality associated with these modules.

In addition, memory 204 of device 200 of FIG. 2 may store images of body portions with cosmetic compositions applied to the body portions. Furthermore, images may be stored in remote storage locations and could be accessed via local networks 160 or wireless networks 170 by mobile device 120. The cosmetic composition module (e.g., in memory 204 of device 200 of FIG. 2) may include instructions that when executed by processor 202 of FIG. 2 may result in processing of image data corresponding to such images to generate a cosmetic application profile for a relevant portion of the body. Instructions related to the cosmetic application profile may be stored in memory 204 of device 200. Cosmetic application profile may be any digital representation of attributes, such as color, brightness, reflectivity, glint, iridescence, or tone that are affected by the application of cosmetic compositions. In one example, it could be a spatial mapping of each of these attributes for each pixel of the image data and its location on the body portion. Alternatively, it could be a spatial mapping of a subset of these attributes for each pixel of the image data.

As explained earlier, face recognition technology may identify specific features of a person's face and compare them to a database of known faces. Such systems first use a camera to capture an image of a person's face and isolate the face from the background or other undesirable captured aspects of the image. Next, face recognition technology may extract specific features from the face, such as the distance between the eyes, the size or shape of the eyes, the shape and the size of the forehead, the shape of the nose, and the size of the mouth etc. Next, the face recognition technology may analyze these features using a trained artificial intelligence neural network to determine whether a sufficient number of the features show a match with an image in a database of known faces (known as 1:N matching). This process may include the use of convolution neural networks (CNNs), recursive neural networks (RNNs), or other types of neural networks that have been trained to extract features from an image and then classify the image as matching (or not) one or more of the known images of the faces.

Face recognition algorithms are imperfect and can create false positives. False positive rates vary across races and gender. Studies conducted by the National Institute of Science and Technology, a US Government agency, have shown that false positive rates not only vary from a face recognition algorithm to another face recognition algorithm, but also vary demographically across race and gender. As one example, some studies have found the highest false positive rates for Native American women and elevated false positive rates in African American and Asian populations relative to white populations. False positive rates have been shown to be higher due to race rather than gender.

Face recognition algorithms are not built to identify particular people; instead, they include a face detector followed by a feature extraction algorithm that converts one or more images of a person into a vector of values that relate to the identity of the person. The extractor typically consists of a neural network that has been trained on ID-labeled images available to the developer. Thus, face recognition algorithms act as generic extractors of identity-related information from photos of people they have usually never seen before. Recognition proceeds in the following manner. First, the face recognition algorithms compare two feature vectors and emit a similarity score. This is a numeric value (specific to each face recognition algorithm) expressing how similar the faces that are being compared are. Second, this numeric value is then compared to a threshold value to decide whether two samples represent the same person or not. Thus, recognition is mediated by persistent identity information stored in a feature vector (or a "template").

Figure 7:
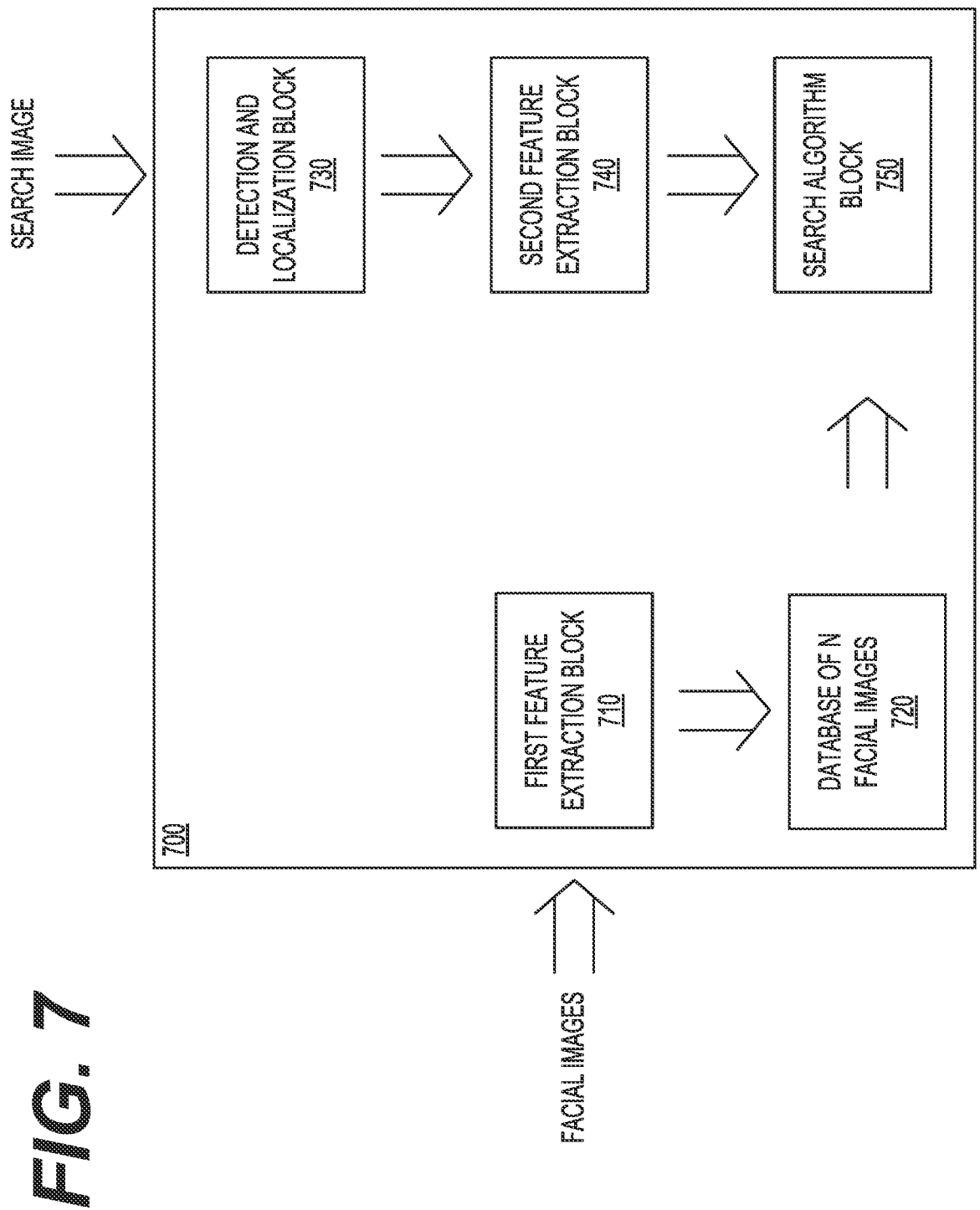
FIG. 7 shows an example system for evaluating the false positive identification rate of a face recognition algorithm in relation to changes to one or more values associated with the image classification features.

FIG. 7 shows an example system 700 for evaluating the false positive identification rate of a face recognition algorithm in relation to changes to one or more values associated with the image classification features. Functional blocks associated with system 700 are shown to illustrate the performance of a 1:N match to produce a candidate list. System 700 includes a first feature extraction block 710, a database of N facial images 720, a detection and localization block 730, a second feature extraction block 740, and a search algorithm block 750. First feature extraction block 710 is used to extract features that comprise the feature vector, which encodes the identity of a person. In this example, first feature extraction block 710 extracts the feature vectors for all N stored images in the database of N facial images 720. Detection and localization block 730 is used to process the image data obtained from an image sensor associated with a camera that captured a facial image of a person. The second feature extraction block 730 is used to extract features that comprise the feature vector, which encodes the identity of a person. In this example, the second feature extraction block 730 extracts the feature vector for the facial image obtained by the image sensor. The extracted feature vector is compared by search algorithm block 750 against the extracted feature vectors for the N stored images. Search algorithm block 750 generates an output that may include a candidate list for any potential matches between the facial image obtained via the image sensor and any of the stored N facial images.

Table 1 below shows the data structures/types that may be used as part of evaluating a relationship between the image classification features and a false positive identification rate of a face recognition algorithm.

| Data Structure/Type | Explanation |
| --- | --- |
| Feature Vector | A vector of real numbers that encodes the identity of a person |
| Sample | One or more images of a person |
| Similarity Score | A measure of the degree of similarity of two faces in two samples, as determined by a face recognition algorithm |
| Template | Data produced by a face recognition algorithm that includes a feature vector |
| Threshold | Any real number against which the similarity scores are |

The candidate list output by system 700 is evaluated to determine the false positive identification rate. In one example, any search results that include a facial image that is not in the database of stored images are considered non-mated search results. In other words, when system 700 outputs a positive match between a facial image of a person that has never been seen by system 700 but is incorrectly associated with a facial image in the stored image database, that search result is counted as a non-mated search result. Assume that system 700 is configured with an enrolled population of N identities (e.g., one each for the N stored images in database of N facial images 720) and the search algorithm is configured to generate L candidate identities that are ranked by their similarity score. The L candidate identities are a subset of the identified images and include only those images that had a similarity score above a preselected threshold T. In this case, the false positive identification rate can be determined using the following equation: FPIR (N, T)=(Number of non-mated searches with one or more candidates that had a similarity score above the threshold value (T)) divided by (the total number of non-mated searches attempted). In this example, the threshold value is a fixed threshold value, which is the same for each demographic and is not tailored for a specific demographic.

As explained earlier, the goal is to increase the FPIR of the face recognition algorithm by modifying the image classification features used by the second feature extraction block 730 of FIG. 7. The image classification features are any features that contribute to the feature vector used to determine the similarity score. Not all image classification features need to be modified. Only a subset of the image classification features that can be controlled using the processes and steps described herein are modified. By repeatedly presenting non-mated facial images with varying degrees of modifications (e.g., caused by subjecting the particles embedded in cosmetic compositions to magnetic fields), the FPIR for various modifications of the image classification features can be obtained. Once such modifications and their impact on the FPIR have been evaluated, only those modifications that increase the FPIR are programmed for use with the devices described herein. Generally adversarial neural-networks (GANs) may be configured to process the modifications and the image data corresponding to images associated with the face, and then may be pitted against each other to increase the FPIR.

As an example, any of the previously described particles may be included in different samples of the cosmetic compositions and facial images of the same person may be acquired. Subsequently, the cosmetic compositions could be subjected to the magnetic fields described earlier. Having altered at least some aspect of the cosmetic composition being evaluated, a second facial image of the same person may be obtained. Through hit and trial, or other methods, appropriate combinations of the particles with cosmetic compositions may be determined. As explained earlier, the suitability of the cosmetic compositions and the particles embedded therein is evaluated to determine their impact on the FPIR. Only those modifications of the particles for certain cosmetic compositions that increase the FPIR are programmed for use with the devices described herein.

The process for evaluating the efficacy of the particles in combination with the cosmetic compositions in the context of increasing the FPIR need not be performed using actual facial images of a person. Instead, simulated images incorporating the impact of the application of the magnetic fields to the cosmetic composition with certain embedded particles may be evaluated. Such simulated images may be created after experimenting with various combinations of particles embedded in cosmetic compositions and an application of the magnetic fields to such cosmetic compositions. The simulated images may also be created using other techniques for studying the impact of cosmetic compositions on the surface area associated with the face.

Figure 8:
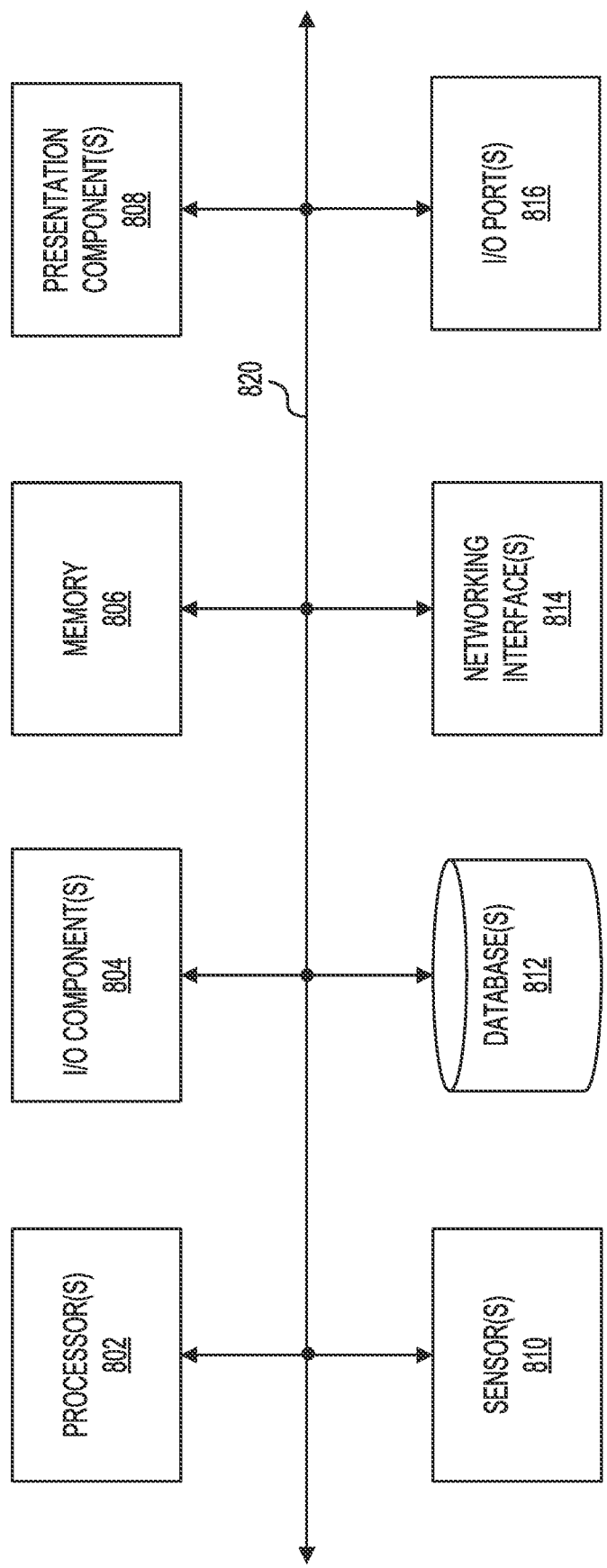
FIG. 8 is a block diagram of a computing system for implementing the system of FIG. 7 in accordance with one example.

FIG. 8 is a block diagram of a computing system 800 for implementing the system 700 of FIG. 7 in accordance with one example. Computing system 800 may be a distributed computing system including components housed in data centers, on customers' premises, or any other location. As an example, computing system 800 is used to implement the various parts of the components, services, layers, processes, and datastores described herein. Computing system 800 includes a processor(s) 802, I/O component(s) 804, a memory 806, presentation component(s) 808, sensor(s) 810, database(s) 812, networking interfaces 814, and I/O port(s) 816, which may be interconnected via bus 820. Processor(s) 802 may execute instructions stored in memory 806 or any other instructions received via a wired or a wireless connection. Processor(s) 802 may include CPUs, GPUs, Application-Specific Integrated Circuits (ASICs), Field-Programmable Gate Arrays (FPGAs), or other types of logic configured to execute instructions. I/O component(s) 804 may include components such as a keyboard, a mouse, a voice recognition processor, or touch screens. Memory 806 may be any combination of non-volatile storage or volatile storage (e.g., flash memory, DRAM, SRAM, or other types of memories). Presentation component(s) 808 may include display(s), holographic device(s), or other presentation device(s). Display(s) may be any type of display, such as LCD, LED, or other types of display. Sensor(s) 810 may include telemetry or other types of sensors configured to detect, and/or receive, information (e.g., conditions associated with the various devices in a data center). Sensor(s) 810 may include sensors configured to sense conditions associated with CPUs, memory or other storage components, FPGAs, motherboards, baseboard management controllers, or the like.

Still referring to FIG. 8, database(s) 812 may be used to store any of the data or files (e.g., metadata store or other datasets) needed for the performance of the various methods and systems described herein. Database(s) 812 may be implemented as a collection of distributed databases or as a single database. Network interface(s) 814 may include communication interfaces, such as Ethernet, cellular radio, Bluetooth radio, UWB radio, or other types of wireless or wired communication interfaces. I/O port(s) 816 may include Ethernet ports, Fiber-optic ports, wireless ports, or other communication ports.

Instructions for enabling various systems, components, devices, methods, services, layers, and processes may be stored in memory 806 or another memory. These instructions when executed by processor(s) 802, or other processors, may provide the functionality associated with the various systems, components, devices, services, layers, processes, and methods described in this disclosure. The instructions could be encoded as hardware corresponding to a processor or a field programmable gate array. Other types of hardware such as ASICs and GPUs may also be used. The functionality associated with the systems, services, devices, components, methods, processes, and layers described herein may be implemented using any appropriate combination of hardware, software, or firmware. Although FIG. 8 shows computing system 800 as including a certain number of components arranged and coupled in a certain way, it may include fewer or additional components arranged and coupled differently. In addition, the functionality associated with computing system 800 may be distributed or combined, as needed.

Figure 9:
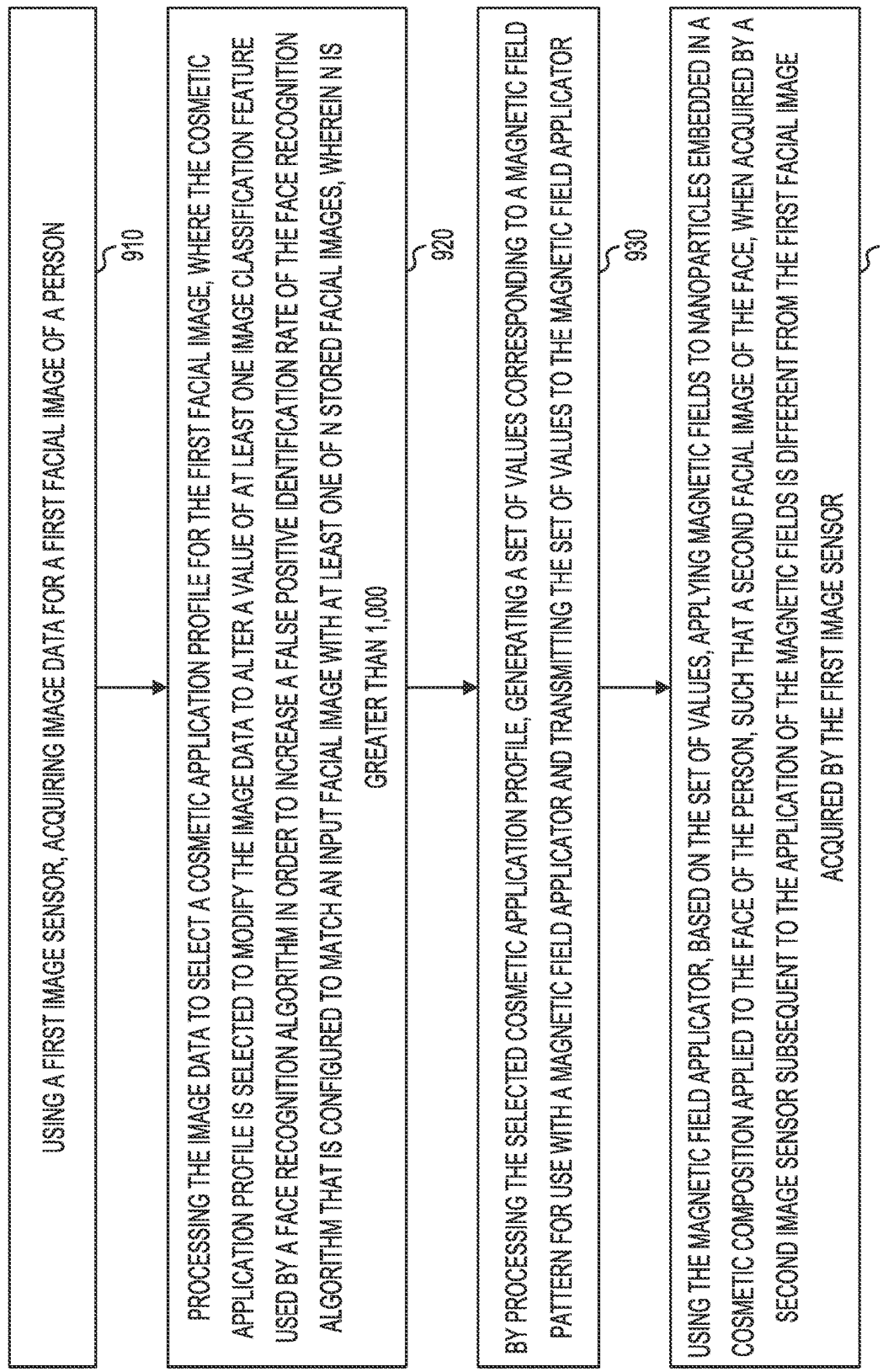
FIG. 9 is a flow chart of a method associated with the various embodiments.

FIG. 9 is an example flow chart 900 of a method associated with the various embodiments described herein. The instructions associated with this method may be stored in the memory of the various devices and systems described herein. Step 910 includes using a first image sensor, acquiring image data for a first facial image of a person. In one example, instructions (along with the camera) that are stored in a memory (e.g., memory 204) of device 200 of FIG. 2 are used for acquiring image data for a facial image of a person.

Step 920 includes processing the image data to select a cosmetic application profile for the first facial image, where the cosmetic application profile is selected to modify the image data to alter a value of at least one image classification feature used by a face recognition algorithm in order to increase a false positive identification rate of the face recognition algorithm that is configured to match an input facial image with at least one of N stored facial images, where N is greater than 1,000. Various instructions stored in a memory of device 200 of FIG. 2 may be used for processing the image data to select a cosmetic application profile for the facial image. As explained earlier, the goal is to increase the FPIR of the face recognition algorithm by modifying the image classification features used by the second feature extraction block 730 of FIG. 7. The image classification features are any features that contribute to the feature vector used to determine the similarity score. Not all image classification features need to be modified. Only a subset of the image classification features that can be controlled using the processes and steps described herein are modified. By repeatedly presenting non-mated facial images with varying degrees of modifications (e.g., caused by subjecting the particles embedded in cosmetic compositions to magnetic fields), the FPIR for various modifications of the image classification features can be obtained.

As explained earlier, as an example, the candidate list output by system 700 of FIG. 7 is evaluated to determine the false positive identification rate. In one example, any search results that include a facial image that is not in the database of stored images are considered non-mated search results. In other words, when system 700 of FIG. 7 outputs a positive match between a facial image of a person that has never been seen by system 700 but is incorrectly associated with a facial image in the stored image database, that search result is counted as a non-mated search result. Assume that system 700 of FIG. 7 is configured with an enrolled population of N identities (e.g., one each for the N stored images in database of N facial images 720 of FIG. 7) and the search algorithm is configured to generate L candidate identities that are ranked by their similarity score. The L candidate identities are a subset of the identified images and include only those images that had a similarity score above a preselected threshold T. In this case, the false positive identification rate can be determined using the following equation: FPIR (N, T)=(Number of non-mated searches with one or more candidates that had a similarity score above the threshold value (T)) divided by (the total number of non-mated searches attempted). In this example, the threshold value is a fixed threshold value is the same for each demographic and is not tailored for a specific demographic.

Once such modifications of image classification features and their impact on the FPIR have been evaluated, only those modifications that increase the FPIR are programmed for use with the devices described herein. The cosmetic application profile selection will be based on this analysis to ensure that the selected cosmetic application profile results in the increase in the FPIR of the one or more commonly used face recognition algorithms.

Step 930 includes by processing the selected cosmetic application profile, generating a set of values corresponding to a magnetic field pattern for use with a magnetic field applicator and transmitting the set of values to the magnetic field applicator. In one example, instructions (along with the camera) that are stored in a memory (e.g., memory 204) of device 200 of FIG. 2 are used for generating the set of values and transmitting those to the magnetic field applicator (e.g., magnetic field applicator 500 of FIG. 5). Additional details associated with generating and transmitting the set of values to the magnetic field applicator are described earlier with respect to FIGS. 5 and 6.

Step 940 includes using the magnetic field applicator, based on the set of values, applying magnetic fields to nanoparticles embedded in a cosmetic composition applied to the face of the person, such that a second facial image of the face, when acquired by a second image sensor subsequent to the application of the magnetic fields is different from the first facial image acquired by the first image sensor. As an example, any of the previously described particles may be included in different samples of the cosmetic compositions and facial images of the same person may be acquired. Nanoparticles may include metallic molecules and melanin molecules attached to the metallic molecules. Cosmetic compositions may include diffractive pigments capable of producing a variation in color based on an angle of observation when hit by visible light. Cosmetic compositions may also include reflective particles. Cosmetic compositions may also include composite pigments including a magnetic core and a coating of an organic coloring substance.

Subsequently, the cosmetic compositions could be subjected to the magnetic fields using the magnetic field applicator 500 described earlier with respect to FIG. 5. Having altered at least some aspect of the cosmetic composition being evaluated, a second facial image of the same person may be obtained. Through hit and trial, or other methods, appropriate combinations of the particles with cosmetic compositions may be determined. As explained earlier, the suitability of the cosmetic compositions and the particles embedded therein is evaluated to determine their impact on the FPIR. Only those modifications of the particles for certain cosmetic compositions that increase the FPIR are programmed for use with the devices described herein.

FIG. 10 is another example flow chart 1000 of a method associated with the various embodiments described herein. The instructions associated with this method may be stored in the memory of the various devices and systems described herein. These instructions when executed may cause the associated processor to perform the steps described as part of flow chart 1000. Step 1010 includes evaluating a face recognition algorithm that is configured to match an input facial image with at least one of N stored facial images, where N is greater than 10,000, to determine a relationship between image classification features and a false positive identification rate of the face recognition algorithm. This step may include modifying the images being processed by the face recognition algorithm to evaluate which image classification features have an impact of the false positive identification rate of the face recognition algorithm. As explained earlier, the image classification features are any features that contribute to the feature vector used to determine the similarity score. Not all image classification features need to be modified. Only a subset of the image classification features that can be controlled using the processes and steps described herein are modified. By repeatedly presenting non-mated facial images with varying degrees of modifications (e.g., caused by subjecting the particles embedded in cosmetic compositions to magnetic fields), the FPIR for various modifications of the image classification features can be obtained.

Step 1020 includes using a first image sensor, acquiring image data for a first facial image of the person, where the image data is acquired by positioning the image sensor at least 40 feet away from the face of the person. In one example, instructions (along with the camera) that are stored in a memory (e.g., memory 204) of device 200 of FIG. 2 are used for acquiring image data for a facial image of a person. Although this step refers to positioning the image sensor at least 40 feet away from the face of the person, depending upon the time of the day or other constraints, the image sensor may be positioned closer to the face or the person or farther away.

Step 1030 includes processing the image data to select a cosmetic application profile for the first facial image, where the cosmetic application profile is selected to modify the image data to alter a value of at least one of the image classification features in order to increase the false positive identification rate of the face recognition algorithm. Various instructions stored in a memory of device 200 of FIG. 2 may be used for processing the image data to select a cosmetic application profile for the facial image. As explained earlier, the goal is to increase the FPIR of the face recognition algorithm by modifying the image classification features used by the second feature extraction block 730 of FIG. 7. The image classification features are any features that contribute to the feature vector used to determine the similarity score. Not all image classification features need to be modified. Only a subset of the image classification features that can be controlled using the processes and steps described herein are modified. By repeatedly presenting non-mated facial images with varying degrees of modifications (e.g., caused by subjecting the particles embedded in cosmetic compositions to magnetic fields), the FPIR for various modifications of the image classification features can be obtained.

As explained earlier, as an example, the candidate list output by system 700 of FIG. 7 is evaluated to determine the false positive identification rate. In one example, any search results that include a facial image that is not in the database of stored images are considered non-mated search results. In other words, when system 700 of FIG. 7 outputs a positive match between a facial image of a person that has never been seen by system 700 but is incorrectly associated with a facial image in the stored image database, that search result is counted as a non-mated search result. Assume that system 700 of FIG. 7 is configured with an enrolled population of N identities (e.g., one each for the N stored images in database of N facial images 720 of FIG. 7) and the search algorithm is configured to generate L candidate identities that are ranked by their similarity score. The L candidate identities are a subset of the identified images and include only those images that had a similarity score above a preselected threshold T. In this case, the false positive identification rate can be determined using the following equation: FPIR (N, T)=(Number of non-mated searches with one or more candidates that had a similarity score above the threshold value (T)) divided by (the total number of non-mated searches attempted). In this example, the threshold value is a fixed threshold value is the same for each demographic and is not tailored for a specific demographic.

Once such modifications of image classification features and their impact on the FPIR have been evaluated, only those modifications that increase the FPIR are programmed for use with the devices described herein. The cosmetic application profile selection will be based on this analysis to ensure that the selected cosmetic application profile results in the increase in the FPIR of the one or more commonly used face recognition algorithms.

Step 1040 includes generating a set of values corresponding to a magnetic field pattern for use with a magnetic field applicator by processing the selected cosmetic application profile and transmitting the set of values to the magnetic field applicator. In one example, instructions (along with the camera) that are stored in a memory (e.g., memory 204) of device 200 of FIG. 2 are used for generating the set of values and transmitting those to the magnetic field applicator (e.g., magnetic field applicator 500 of FIG. 5). Additional details associated with generating and transmitting the set of values to the magnetic field applicator are described earlier with respect to FIGS. 5 and 6.

Step 1050 includes based on the set of values applying magnetic fields, using the magnetic field applicator, to nanoparticles embedded in a cosmetic applied to the face of the person to modify an appearance of the cosmetic such that a second facial image of the face when acquired by a second image sensor, different from the first image sensor, subsequent to the application of the magnetic fields is altered to increase the false positive identification rate of the face recognition algorithm when detecting a 1:M match between the second facial image and M stored facial images, where M is greater than 10,000. Nanoparticles may include metallic molecules and melanin molecules attached to the metallic molecules. Cosmetic compositions may include diffractive pigments capable of producing a variation in color based on an angle of observation when hit by visible light. Cosmetic compositions may also include reflective particles. Cosmetic compositions may also include composite pigments including a magnetic core and a coating of an organic coloring substance.

Subsequently, the cosmetic compositions could be subjected to the magnetic fields using the magnetic field applicator 500 described earlier with respect to FIG. 5. Having altered at least some aspect of the cosmetic composition being evaluated, a second facial image of the same person may be obtained. Through hit and trial, or other methods, appropriate combinations of the particles with cosmetic compositions may be determined. As explained earlier, the suitability of the cosmetic compositions and the particles embedded therein is evaluated to determine their impact on the FPIR. Only those modifications of the particles for certain cosmetic compositions that increase the FPIR are programmed for use with the devices described herein.

Moreover, the increase in the FPIR of a face recognition algorithm may also be used to improve the face recognition algorithm. As an example, the image classification features that appear to result in a higher FPIR for certain population groups may be supplemented with additional image classification features, including features that are less impacted by the application of the cosmetic compositions. Such features may include the distance between certain features of the eyes. The distance between the eyes and the bottom of the nose and other such features.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, or the component B may be a sub-component of the component A.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
using a first image sensor, acquiring image data for a first facial image of a person;
selecting an application profile for the first facial image, wherein the application profile is selected to alter a value of at least one image classification feature used by a face recognition algorithm in order to increase a false positive identification rate of the face recognition algorithm that is configured to match an input facial image with at least one of N stored facial images, wherein N is greater than 1,000; and
based on the selected application profile, modifying an aspect associated with the face of the person, such that a second facial image of the face, when acquired by a second image sensor subsequent to the modification of the aspect, is different from the first facial image acquired by the first image sensor.

2. The method of claim 1, wherein the application profile comprises a cosmetic application profile.

3. The method of claim 2, wherein the aspect associated with the face of the person comprises cosmetic applied to the face of the person.

4. The method of claim 3, further comprising, by processing the selected cosmetic application profile, generating a set of values corresponding to a magnetic field pattern for use with a magnetic field applicator and transmitting the set of values to the magnetic field applicator.

5. The method of claim 4, further comprising, using the magnetic field applicator, based on the set of values, applying magnetic fields to nanoparticles embedded in the cosmetic applied to the face of the person.

6. The method of claim 5, wherein the nanoparticles include metallic molecules, and wherein the nanoparticles include melanin molecules attached to the metallic molecules.

7. The method of claim 1, further automatically selecting the application profile based on a location of the person.

8. A method comprising:
based on a location of a person, automatically selecting an application profile for a first facial image of the person acquired using a first image sensor, wherein the application profile is selected to alter a value of at least one image classification feature used by a face recognition algorithm in order to increase a false positive identification rate of the face recognition algorithm that is configured to match an input facial image with at least one of N stored facial images, wherein N is greater than 1,000;
based on the selected application profile, modifying an aspect associated with the face of the person, such that a second facial image of the face, when acquired by a second image sensor subsequent to the modification of the aspect, is different from the first facial image acquired by the first image sensor.

9. The method of claim 8, wherein the application profile comprises a cosmetic application profile.

10. The method of claim 9, wherein the aspect associated with the face of the person comprises cosmetic applied to the face of the person.

11. The method of claim 10, wherein the cosmetic includes diffractive pigments capable of producing a variation in color based on an angle of observation when hit by visible light.

12. The method of claim 10, wherein the cosmetic includes reflective particles.

13. The method of claim 10, wherein the cosmetic includes composite pigments including a magnetic core and a coating of an organic coloring substance.

14. A method comprising:
using a first image sensor, acquiring image data for a first facial image of a person;
selecting an application profile for the first facial image, wherein the application profile is selected to alter a value of at least one image classification feature used by a face recognition algorithm in order to increase a false positive identification rate of the face recognition algorithm that is configured to match an input facial image with at least one of N stored facial images, wherein N is greater than 1,000; and
based on the selected application profile, modifying an appearance of cosmetic applied to the face of the person, such that a second facial image of the face, when acquired by a second image sensor subsequent to the modification of the appearance of the cosmetic, is different from the first facial image acquired by the first image sensor.

15. The method of claim 14, wherein the application profile comprises a cosmetic application profile.

16. The method of claim 15, further comprising, by processing the selected cosmetic application profile, generating a set of values corresponding to a magnetic field pattern for use with a magnetic field applicator and transmitting the set of values to the magnetic field applicator.

17. The method of claim 16, further comprising, using the magnetic field applicator, based on the set of values, applying magnetic fields to nanoparticles embedded in the cosmetic applied to the face of the person.

18. The method of claim 17, wherein the nanoparticles include metallic molecules, and wherein the nanoparticles include melanin molecules attached to the metallic molecules.

19. The method of claim 14, wherein the cosmetic includes at least one of diffractive pigments capable of producing a variation in color based on an angle of observation when hit by visible light or reflective particles.

20. The method of claim 14, wherein the cosmetic includes composite pigments including a magnetic core and a coating of an organic coloring substance.

* * * * *